(12) United States Patent
Chang et al.

(10) Patent No.: US 12,349,009 B2
(45) Date of Patent: Jul. 1, 2025

(54) CAST TYPE TRANSMISSION MANAGEMENT DURING HANDOVERS FOR SIDELINK COMMUNICATION

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 350 days.

(21) Appl. No.: 17/798,471

(22) PCT Filed: Feb. 10, 2021

(86) PCT No.: PCT/US2021/017369
§ 371 (c)(1),
(2) Date: Aug. 9, 2022

(87) PCT Pub. No.: WO2021/163125
PCT Pub. Date: Aug. 19, 2021

(65) Prior Publication Data
US 2023/0109689 A1 Apr. 13, 2023

Related U.S. Application Data

(60) Provisional application No. 62/976,163, filed on Feb. 13, 2020.

(51) Int. Cl.
*H04W 36/00* (2009.01)
*H04W 36/08* (2009.01)

(52) U.S. Cl.
CPC ... *H04W 36/0009* (2018.08); *H04W 36/0016* (2013.01); *H04W 36/037* (2023.05); *H04W 36/08* (2013.01)

(58) Field of Classification Search
CPC ......... H04W 36/0009; H04W 36/0016; H04W 36/037; H04W 36/08; H04W 92/18
USPC ........ 370/331, 312, 329, 328, 337; 455/436, 455/437, 439
See application file for complete search history.

(56) References Cited

U.S. PATENT DOCUMENTS

| | | |
|---|---|---|
| 9,241,244 B2 | 1/2016 | Chun et al. |
| 9,473,906 B2 | 10/2016 | Yu et al. |
| 2010/0322196 A1 | 12/2010 | Cherian et al. |
| 2012/0314641 A1 | 12/2012 | Kotecha et al. |
| 2014/0135019 A1* | 5/2014 | Jang ............ H04W 36/302 455/437 |
| 2020/0092685 A1* | 3/2020 | Fehrenbach ........ H04W 36/08 |
| 2022/0110105 A1* | 4/2022 | Belleschi ............ H04W 72/23 |

OTHER PUBLICATIONS

Vivo; "Left issues on NR SL RLC and PDCP," R2-1914922; 3GPP TSG-RAN 2 Meeting #108; Nov. 8, 2019; Reno, US.

* cited by examiner

*Primary Examiner* — Kwang B Yao
*Assistant Examiner* — Bradley D Lytle, Jr.

(57) ABSTRACT

A first user equipment (UE) device manages the cast type for transmissions to other UE devices within a group during handovers. At least two cast types can be used from a set of cast types that comprises groupcast and unicast although other cast types may be included.

16 Claims, 8 Drawing Sheets

CAST TYPE TRANSMISSION MANAGEMENT DURING HANDOVERS FOR SIDELINK COMMUNICATION

CLAIM OF PRIORITY

The present application claims the benefit of priority to Provisional Application No. 62/976,163 entitled "Sidelink Transmissions During Handover", filed Feb. 12, 2020, assigned to the assignee hereof and hereby expressly incorporated by reference in its entirety.

FIELD

This invention generally relates to wireless communications and more particularly to cast type transmission management during handovers for sidelink communication.

BACKGROUND

Many wireless communication systems that employ several base stations that provide wireless service to user equipment (UE) devices enable sidelink communication between two or more UE devices where the UE devices can communicate directly with other UE devices. Such sidelink communications sometimes include one UE device (group leader UE device) that transmits the same data to multiple UE devices in a group. Different transmission techniques often referred to as cast types can be used to transmit the same data to multiple UE devices. Cast types include at least unicast, groupcast and broadcast. A unicast transmission can only be received by the single UE device that is the intended recipient of the data. Accordingly, multiple transmissions are required to send the same data to multiple UE devices using unicast. A broadcast transmission can typically be received by all UE devices within range of the transmission. A groupcast transmission can only be received by the UE devices that are members of a group. Accordingly, for example, the group leader UE device can transmit the same data in a single transmission using groupcast to two or more UE devices in the group or can send the same data in multiple unicast transmissions to the UE devices.

SUMMARY

A first user equipment (UE) device manages the cast type for transmissions to other UE devices within a group during handovers. At least two cast types can be used from a set of cast types that comprises groupcast and unicast although other cast types may be included. In one example, the group includes the first UE device, a second UE device and a third UE device. The first UE device transmits first data in a first transmission using an initial cast type to the second UE device and the third UE device while the first UE device, the second UE device and the third UE device are being served by a source base station. In response to determining that the second UE device has initiated a handover to a target base station, the first UE device selects a handover cast type from the set of cast types based at least on the available communication resources and transmits second data in a second transmission using the handover cast type to the second UE device. The first UE device also transmits the second data in a third transmission to the third UE device using the initial cast type.

DETAILED DESCRIPTION

As discussed above, different cast types can be used for communication between UE devices. Although UE device groups may be formed and used in different situations and environments, one scenario where grouping UE devices is particularly useful includes vehicle platoons where vehicles dynamically form a platoon while travelling together. All the vehicles in the platoon obtain information from the leading vehicle to manage the platoon. In some implementations, the information facilitates travel of the vehicles in the same direction in a coordinated manner and allows the vehicles to drive closer than in normal situations where there is no communication between the vehicles. Vehicles of the same platoon are involved in sharing the necessary information required to support the platoon operations where the information may include, for example, the distance between vehicles, relative speeds, and updates from roadside units (RSUs). Similar requirements also apply to the Extended Sensor use case where UE devices exchange data gathered through local sensors or live video data among vehicles, RSUs, pedestrian devices, and V2X application servers. Groupcast techniques allow efficient transmission of the information from one UE device, such as the platoon leader, to the other UE device members of the group.

As the platoon, or other group of UE devices, moves through communication service areas (cells), it is likely that some of the group member UE devices will begin handover procedures before others. Based on available communication resources in each cell and other factors, one or more cast types may not be available in the next cell down the road. For example, where the group leader is using groupcast for all UE devices while the group is in a source cell, groupcast may not be available (or at least may not be the preferred cast type) for a UE device engaging in a handover to a target cell. Accordingly, management of cast types during handovers for groups, such as those used in platoons, is needed. In accordance with the techniques discussed herein, the group leader UE device (first UE device) manages the cast type for transmissions to other UE devices within a group during handovers.

Figure 1A:
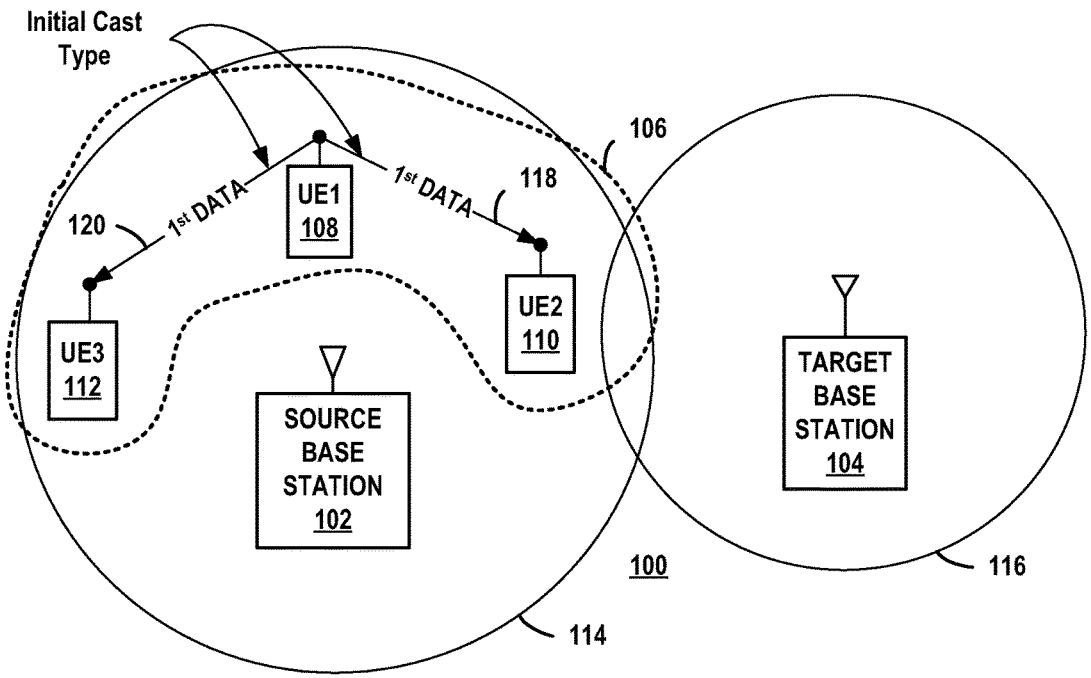
FIG. 1A is a block diagram of an example of a communication system 100 including a serving base station, a target base station and user equipment (UE) group including a first UE device, a second UE device, and a third UE device before a handover.

FIG. 1A is a block diagram of an example of a communication system 100 including a serving base station 102, a target base station 104 and user equipment (UE) group 106 including a first UE device 108, a second UE device 110, and a third UE device 112 before a handover. Although the techniques discussed herein may be applied to various types of systems and communication specifications, the devices of the example operate in accordance with 3GPP New Radio (NR) V2X and LTE C2X (Rel-14). The techniques discussed herein may be applied to other communication specifications where sidelink or D2D is employed. More specifically the techniques may be applied to current and future releases of 3GPP LTE and NR specifications. For example, the techniques may also be applied to 3GPP NR (Rel-17). For the example, the UE devices 108, 110, 112 may be any type of device that can receive signals from, and transmit signals to, base stations and other UE devices.

Although the group 106 includes three UE devices in the example, the group 106 may include any number of devices. For the example, all three UE devices 108, 110, 112 of the group 106 are initially located in a source base station service area 114 of the source base station 102. The source base station 102, therefore, is providing wireless service to all UE device members of the group 106 in FIG. 1A. The target base station 104 provides the target base station service area 116 adjacent to, and that may overlap with, the source base station service area 114. The group 106 is moving such that at least one of the UE devices will enter the target base station service area 116. As a result, a handover will be initiated for at least one of the UE devices, when it is sufficiently close to the target base station 104.

While the group 106 is within the source base station service area 114, the first UE device 108 transmits signals 118, 120 that includes first data using an initial cast type to the second UE device 110 and the third UE device 112. Although the initial cast type may be unicast, the initial cast type is groupcast for the example discussed with reference to FIG. 1A, FIG. 1B and FIG. 1C.

Figure 1B:
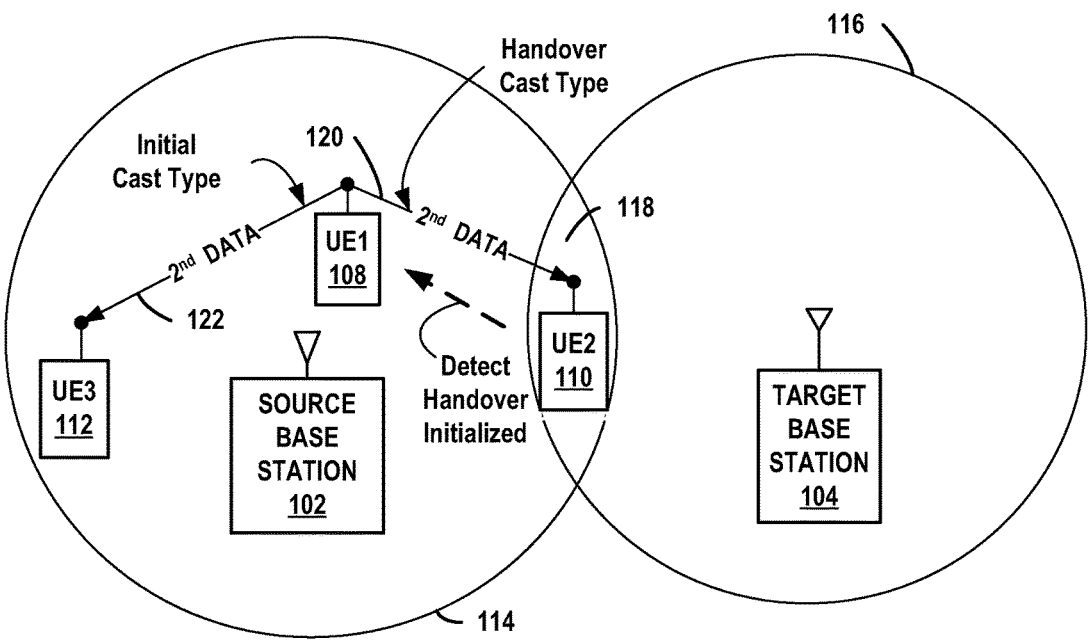
FIG. 1B is a block diagram of the communication system for the example where a handover has been initialized for the second UE device.

FIG. 1B is a block diagram of the communication system 100 for the example where a handover has been initialized for the second UE device 110. In accordance with known techniques, a handover is initialized when the second UE device 110 travels into the target base station service area 116. The first UE device 108 detects the handover initialization. For the example, the first UE device detects the handover initialization based on one or more messages sent from the second UE device. Such a technique is particularly useful where the initial cast type is groupcast. Unlike unicast connections, groupcast connections do not support PC5-RRC. As a result, control signaling directly over PC5 must be handled in the V2X application layer (but still over the PC5 link). Messages from the group member UE devices may be in response to requests from the first UE device (group leader) 108 or may be initiated by the individual group member UE devices 110, 112. Where the messages are initiated by the group member UE devices, a message may be triggered by a change in communication by the particular UE device. For example, a message can be sent by a UE device when a handoff is initiated and/or when a handoff is completed. Information regarding the target cell may be included in the message in some situations. Where the group leader initiates the transmission of the message with a request, the group leader may request cell ID information from the second UE device in some examples.

In other situations, the first UE device 108 detects the handover initialization by detecting changes in the transmission communication resources used by the second UE device 110 where the transmissions may be SL HARQ feedback. When the second UE device 110 enters the handover region 118 and a handover to the target base station 104 is initiated, the second UE device 110 determines whether exceptional resources are available. The second UE device 110 determines that it has entered the handover region based on the triggering of a measurement report. If exceptional resources are available, the second UE device 110 uses the exceptional resources for sidelink transmission to the first UE device. For the example, the first UE device 108 monitors all sidelink resources including exceptional resources and can detect when the second UE device 110 (or any other group member) is using resources not originally assigned by the source base station 102. Where first UE device 108 is within a vehicle, as in most situations with V2X communication, power consumption for monitoring the resources is not generally a concern. In some situations where there is no upcoming sidelink transmission from the second UE device 110 to the first UE device 108, the second UE device 110 sends an indicator to allow the first UE device 108 to detect the change in communication resources and detect the initiation of the handover.

In response to detecting that a handover of the second UE device has been initiated, the first UE device 108 selects the cast type for transmission of sidelink transmissions to the second UE device 110 during the handover. The first UE device 108 determines whether a change in cast type during the handover is beneficial for communication with the second UE device 110. Any combination of factors can be evaluated to determine whether a change in cast type is appropriate. In one example where the current cast type is groupcast, the first UE device 108 may evaluate whether unicast is preferred based on the availability of exceptional resources. Therefore, if the first UE device 108 determines the second UE device 110 is using exceptional resources, the first UE device 108 may select unicast as the handover cast type. Although the use of exceptional resources may require the use of contention-based resources, the unicast connection may nonetheless be more reliable since radio link failure determination is supported only for unicast connection. In an example where the current cast type is unicast, the first UE device 108 may determine that groupcast is the appropriate handover cast type based on whether HARQ feedback resources are available. In some situations, HARQ feedback resources are not available as part of the exceptional resources. HARQ feedback is required to support a unicast connection, whereas HARQ feedback is optionally configured with groupcast. Therefore, the first UE device 108 may determine that the change from unicast to groupcast is needed in order to maintain HARQ feedback capability. For the example, the first UE device 108 is notified through SIB whether HARQ feedback resources are available in the handover region 118.

In some situations, the first UE device 108 may select the handover cast type based on the available resources for UE to UE (sidelink) communication in the target cell. Such situations, however, require the first UE device 108 to obtain communication resource information of the target cell 104. In some implementations, the network facilitates the first UE device 108 in obtaining the information. In other situations, the second UE device 110 may provide the information to the first UE device 108. If possible, therefore, the first UE device 108 determines available communication resources for UE to UE communication in a handover region 118 between cells (service areas) 114, 116 of the source base station and the target base station. Based on the available communication resources, the first UE device 108 selects the handover cast type from the set of cast types.

After selecting the handover cast type, the first UE device 108 transmits second data in a second transmission 120 using the handover cast type to the second UE device 110. The second data is also transmitted to the third UE device 112 in a third transmission 122 using the initial cast type. In some scenarios, therefore, the first UE device 108 transmits the same data to group members using different cast types.

For the example, the first UE device 108 executes a procedure to change the cast type after selecting the handover cast type. Where the cast type is being changed to the second UE device 110, the first UE device 108 informs the serving cell of the initiation of a sidelink connection to the second UE device 110. Where the change in cast type is from groupcast to unicast, the first UE device 108 informs the serving cell (source base station 102) that a sidelink unicast connection is to be initiated with the second UE device 110. In response, the serving cell configures a new side link radio bearer (SLRB) to the group leader (first UE device 108) for the sidelink unicast connection.

The group leader (first UE device 108) then sends a sidelink communication request message over PC5 to the group member (second UE device 110). In response to receiving the request message, the second UE device 110 sends an RRC Request message (SidelinkUEInfromation message) over the Uu link to its serving cell. If the handover of the second UE to the target cell is complete, the serving cell is the target cell (target base station 104). In some situations where the handover is not yet complete, the serving cell may be the source cell (source base station 102). The RRC request message is to establish a corresponding SLRB configuration for the PC5 unicast connection. If accepted, the serving cell informs the second UE device 110 of the configured SLRB for the connection, and the sidelink unicast connection over PC5 can be completed. The procedure is similar for a change from unicast to groupcast except the request to the serving cell is for groupcast rather than unicast.

For the examples herein, the source base station 102 notifies the target base station 104, over an Xn connection, of the ongoing group communication for the second UE device 110 when the second UE device 110 initiates handover procedure. For the example, the information provided to the target base station 104 includes the SLRB configuration. In some situations, the cast type may also be provided. In some situations, the handover cast type is the same cast type that has been in use (initial cast type) and there is no immediate change in cast type in response to the initiation of a handover of the second UE device 110. However, where the target cell cannot support the particular connection, the first UE device 108 may select a different cast type after the handover of the second UE device 110 is completed to the target cell. For example, if the target base station 104 cannot support the particular SLRB, the target base station 104 notifies the second UE device 110 and the second UE device 110 informs the first UE device 108. The first UE device 108 may then select a different cast type for communication with the second UE device 110.

Figure 1C:
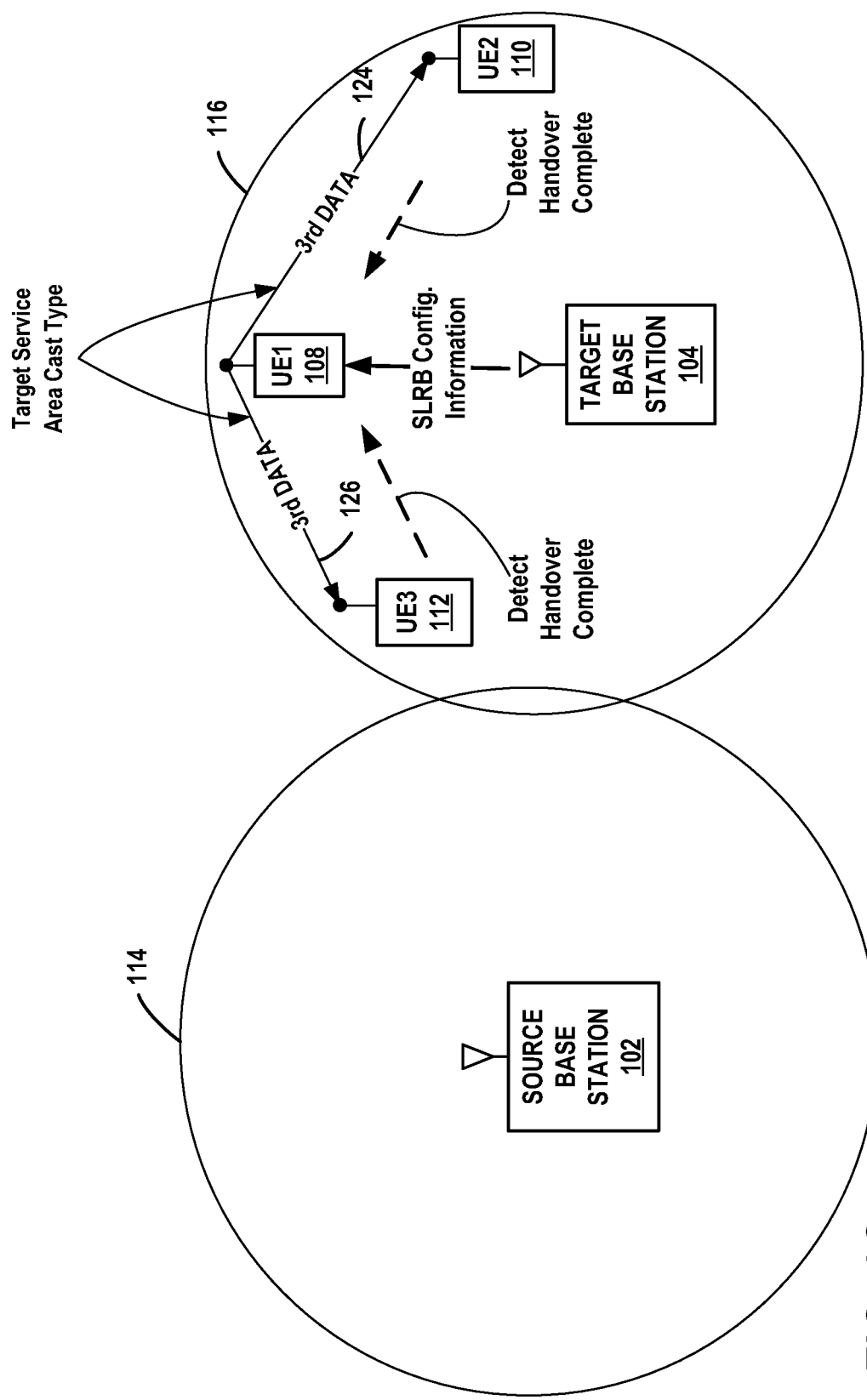
FIG. 1C is a block diagram of the communication system for the example where the handover for each UE device of the group has been completed.

FIG. 1C is a block diagram of the communication system 100 for the example where the handover for each UE device of the group has been completed. The first UE device 108 determines that each UE device 110, 112 of the group 106 has completed a handover to the target base station 104. The determination may be based on messages from the group member UE devices or based on detection of the transmission resources being used by the UE devices 110, 112. As discussed above, messages from the group member UE devices 110, 112 may be in response to requests from the first UE device (group leader) 108 or may be initiated by the individual UE devices. Where the messages are initiated by the group member UE devices, a message may be triggered by a change in communication by the particular UE device. For example, a message can be sent by a UE device when the handoff is completed. Information regarding the target cell may be included in the message in some situations. Where the group leader initiates the transmission of the message with a request, the group leader may request cell ID information from the second UE device in some examples. In other situations, the first UE device 108 detects the handover initialization by detecting changes in the transmission communication resources used by the second UE device including transmissions of SL HARQ feedback.

In response to detecting that each UE device 108, 110 has completed the handover to the target base station 104 and after target base station 104 is the serving base station of the first UE device 108, the first UE device 108 selects the cast type for transmission of sidelink transmissions within the target base station service area 116. In the interests of clarity, the target base station 104 and the target service area 116 are referred to as such even though the target base station 104 becomes a new serving cell for all of the UE devices 108, 110, 112 in the group 106 after handovers are completed. For the example discussed herein, the first UE device 108 obtains sidelink radio bearer (SLRB) configuration information from the target base station 104 for the cast type requested. If the requested cast type is groupcast, then the first UE device 108 may also provide the number of group member UE devices and the UE identifiers (IDs) of the group members to the target base station before it is configured with the SLRB configuration information. As is known, the AS layer is a functional layer in LTE wireless telecom protocol stacks between the radio network and UE devices where the access stratum is responsible for transporting data over the wireless connection and managing radio resources.

After selecting a target service area cast type for sidelink transmission in the target base station service area 116, the first UE device 108 transmits third data to the second UE device 110 and to the third UE device 112. Where the target service area cast type is unicast, the third data is transmitted in separate transmissions 124, 126 to the UE devices. Where the target service area cast type is groupcast, the third data is transmitted in a single transmission that is received by both UE devices 110, 112. Accordingly, the transmissions 124, 126 for groupcast are the same transmission.

Figure 2:
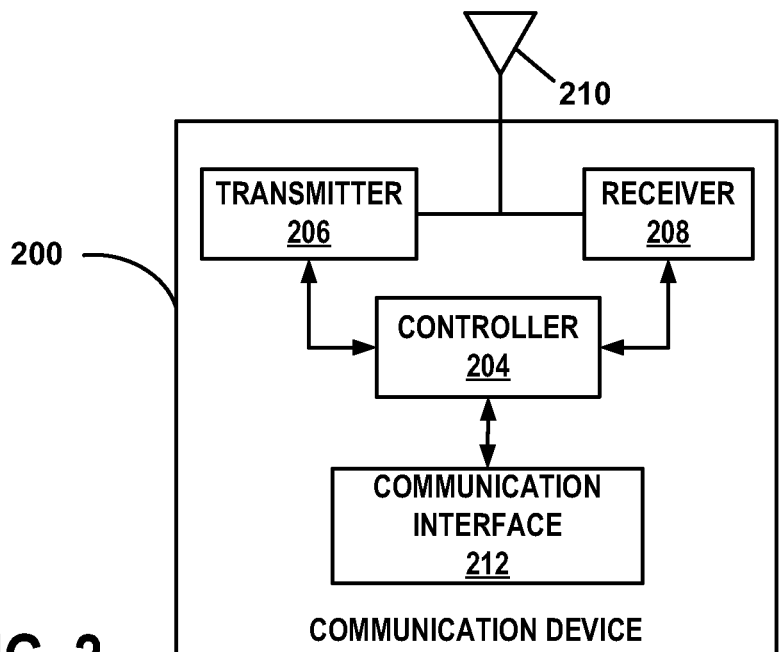
FIG. 2 is a block diagram of an example of a communication device suitable for use as each of the base stations.

FIG. 2 is a block diagram of an example of a base station 200 suitable for use as each of the base stations 102, 104. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 102, 104 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP NR operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
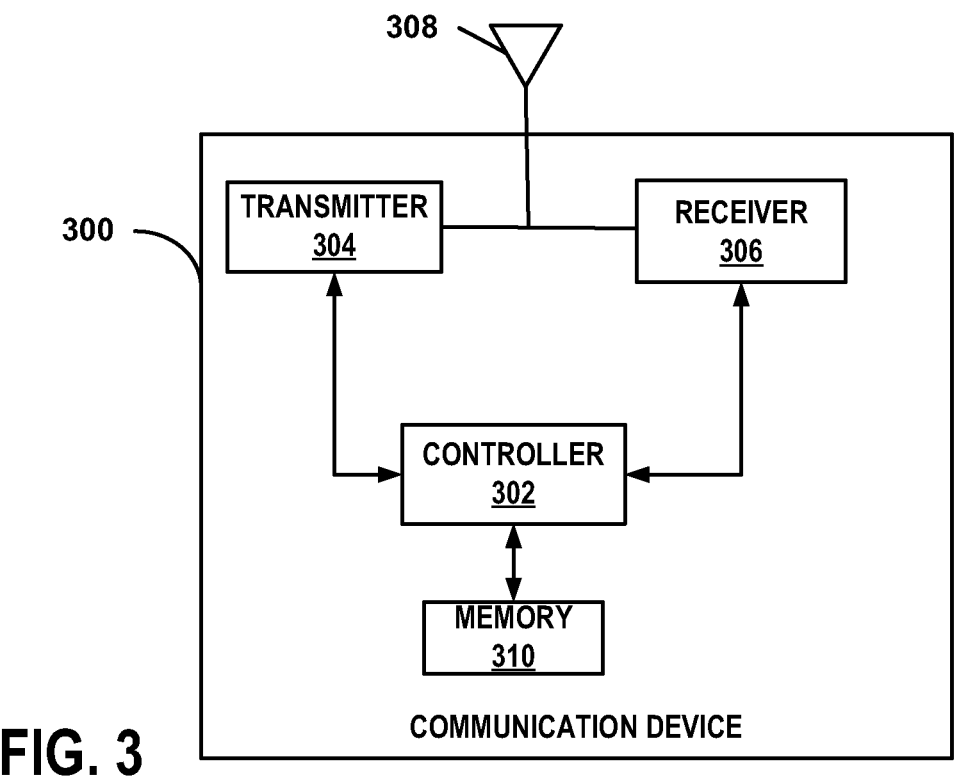
FIG. 3 is a block diagram of an example of a UE device suitable for use as each of the UE devices.

FIG. 3 is a block diagram of an example of a UE device 300 suitable for use as each of the UE devices 108, 110, 112. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, (106-109), therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 4:
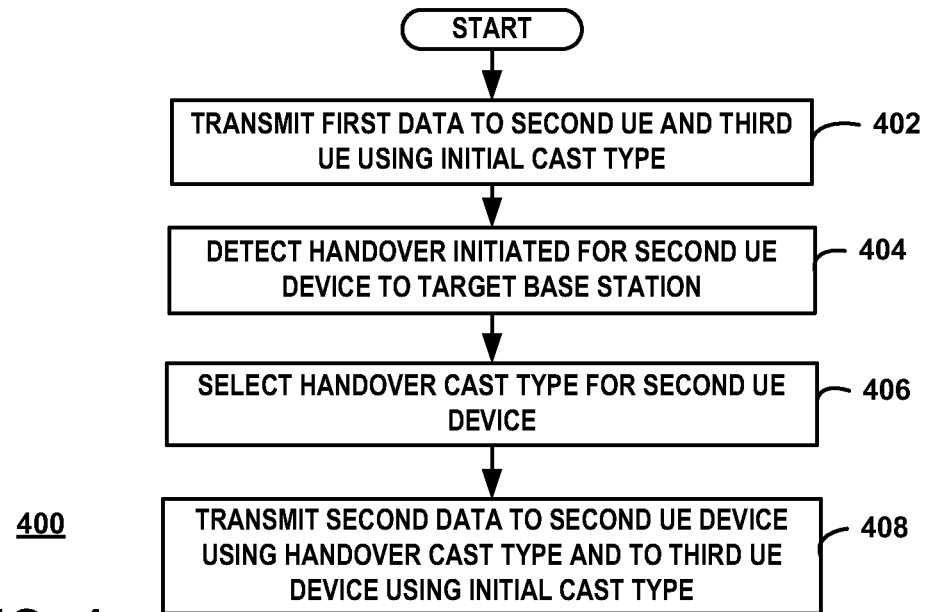
FIG. 4 is a flow chart of an example of a method of managing cast types for a group during a handover.

FIG. 4 is a flow chart of an example of a method 400 of managing cast types for a group 106 during a handover. For the example, the method is performed by a UE device operating in a NR V2X or LTE C-V2X system such as the system 100 described above. Accordingly, the method may be performed by the first UE device 108. For the example of FIG. 4, the second UE device 110 initiates a handover to the target base station 104 while the first UE device 108 is still served by the source base station 102.

At step 402, first data is transmitted to the second UE device 110 and a third UE device 112 using an initial cast type. For the example, the first data is sent to the second UE device and the third UE device using either groupcast or unicast. Other cast types may be used in some circumstances.

At step 404, the first UE device (group leader) 108 detects that a handover has been initiated for the second UE device 110 from the source base station 102 to the target base station 104. The first UE device 108 may detect the handover has been initiated based on information sent in a PC5 message by the second UE device 110 or may detect the handover has been initiated by the change in transmission resources used by the second UE device 110 to send a sidelink transmission to the first UE device 108. For example, the first UE device 108 may detect that exceptional resources were used by the second UE device 110 indicating that the second UE device is in the handover region 118.

At step 406, the first UE selects a handover cast type from a set of cast types for the second UE device. The selection is typically based on consideration of factors related to reliability of the sidelink and efficiency. In some circumstances, the first UE device may select the initial cast type as the handover cast type. In another situation, the initial cast type may be groupcast and the first UE device selects unicast. In yet in another situation, the initial cast type may be unicast and the first UE device selects groupcast.

At step 408, the first UE device 108 transmits second data to the second UE device 110 using the selected handover cast type and transmits the second data to the third UE device using the initial cast type.

Figure 5:
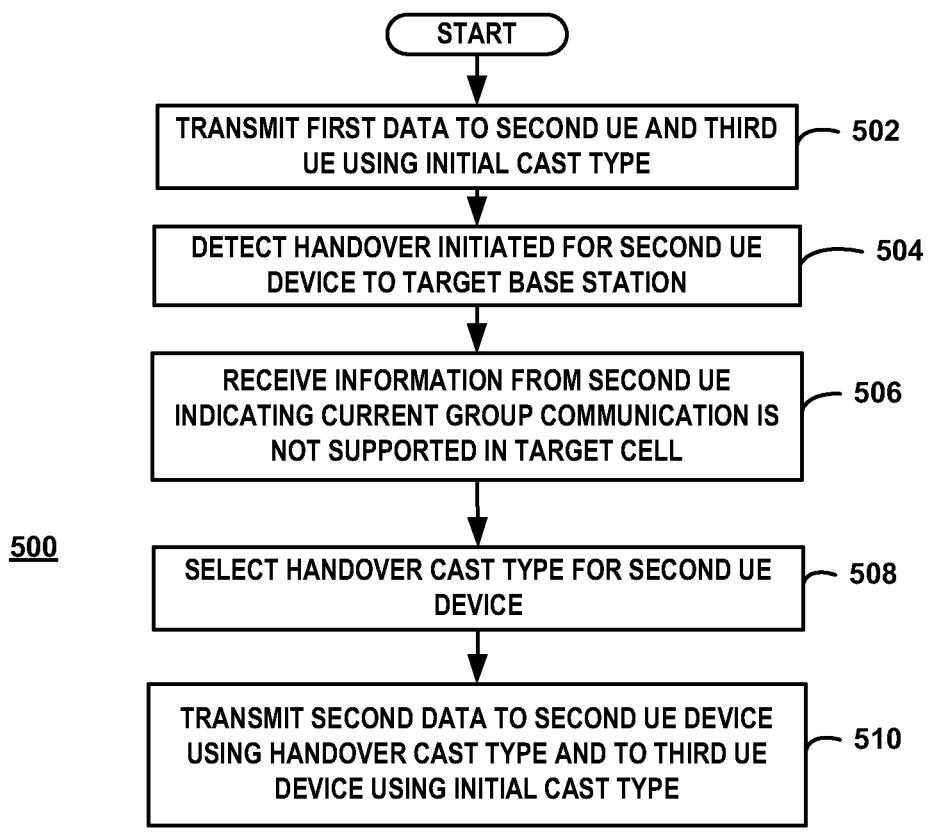
FIG. 5 is a flow chart of an example of a method of managing cast types for a group during handover where the target base station does not support the current group communication.

FIG. 5 is a flow chart of an example of a method 500 of managing cast types for a group during handover where the target base station does not support the current group communication. For the example, the method is performed by a UE device operating in a NR V2X or LTE C-V2X system such as the system 100 described above. Accordingly, the method may be performed by the first UE device 108. For the example of FIG. 5, the second UE device 110 initiates a handover to the target base station while the first UE device 108 is still served by the source base station 102.

At step 502, first data is transmitted to the second UE device 110 and a third UE device 112 using an initial cast type. For the example, the first data is sent to the second UE device 110 and the third UE device 112 using either groupcast or unicast. Other cast types may be used in some circumstances.

At step 504, the first UE device (group leader) 108 detects that a handover has been initiated for the second UE device 110 from the source base station 102 to the target base station 104.

At step 506, information is received from the second UE device 110 indicating that the current group communication is not supported by the target base station 104. For example, the second UE device in the target cell may send an RRC Request message (SidelinkUEInfromation message) over the Uu link to its new serving cell (the target cell) to setup a corresponding SLRB configuration for the current group communication. The second UE device 110 notifies the first UE device 108 if the request is denied.

At step 508, the first UE device selects a handover cast type in response to the information received from the second UE device. For example, if the current group communication is groupcast using a particular SLRB and the SLRB is not supported by the target cell, the first UE device 108 may select unicast as the cast type for communication with the second UE device 110 for group communication.

At step 510, the first UE device 108 transmits second data to the second UE device 110 using the selected handover cast type and transmits the second data to the third UE device 112 using the initial cast type.

Figure 6A:
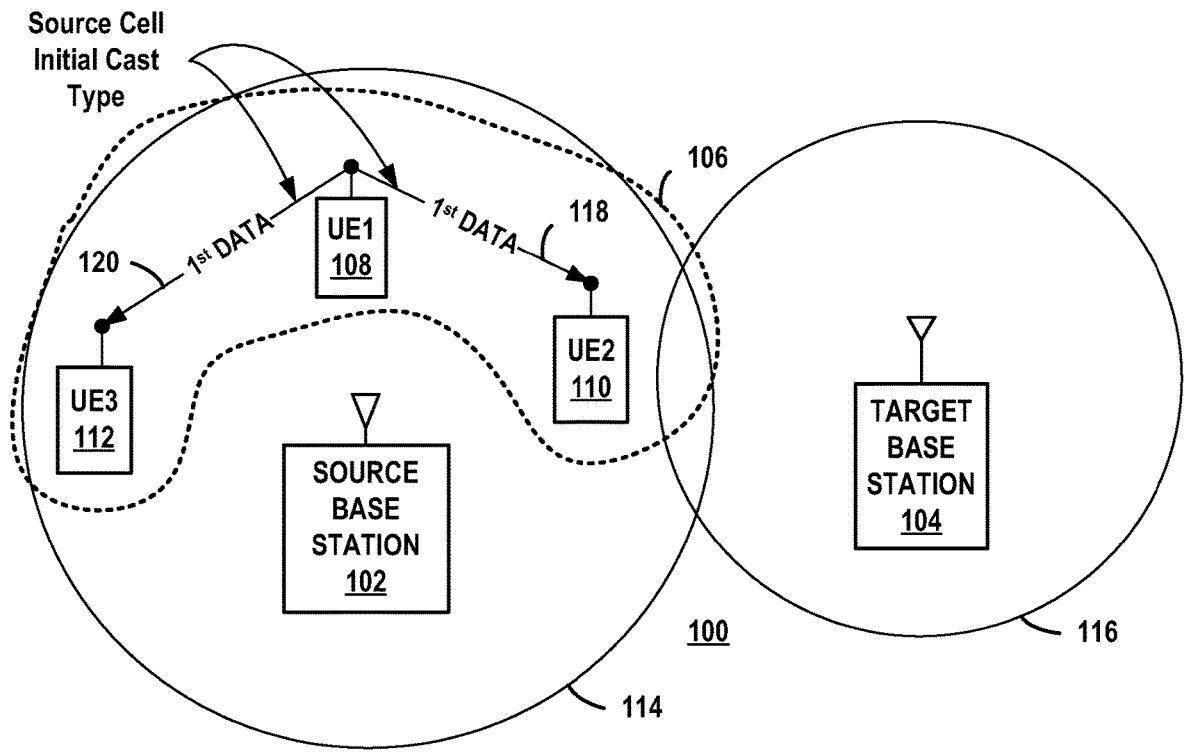
FIG. 6A is a block diagram of an example of the communication system where the group leader (first UE device) performs a handover to the target base station before managing a handover of the second UE device to the target base station
Figure 6B:
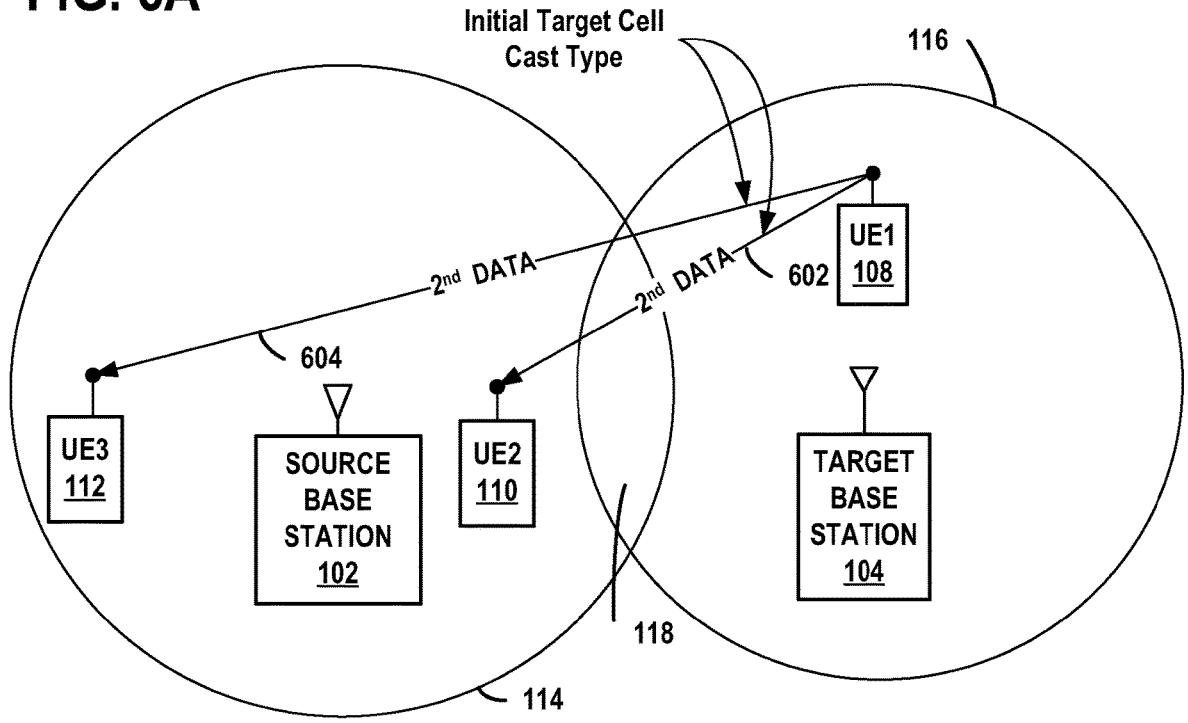
FIG. 6B is a block diagram of the handover management example where the group leader (first UE device) has completed a handover to the target base station.
Figure 6C:
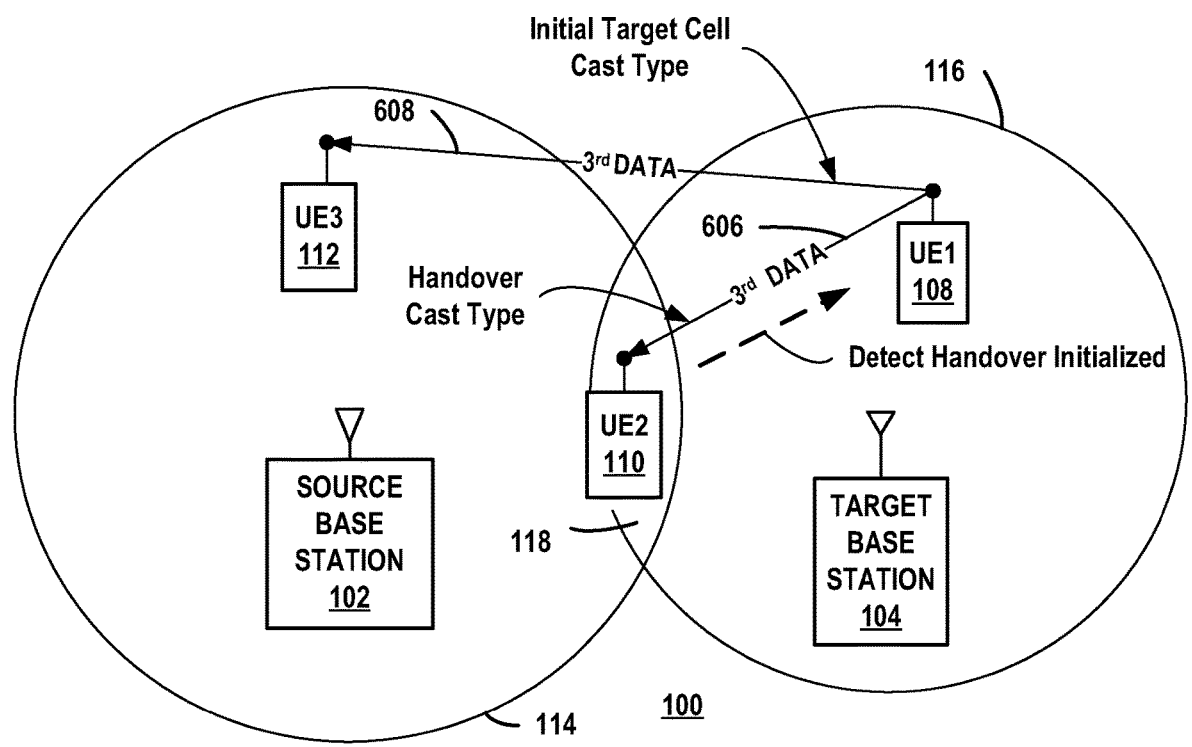
FIG. 6C is a block diagram of the communication system for the example where a handover has been initialized for the second UE device to the target base station when the target base station is the serving base station of the first UE device.

The examples discussed with reference to FIG. 1A, FIG. 1B, FIG. 1C, FIG. 4, and FIG. 5 are directed to situations where a group member performs a handover to the target cell while the group leader is still served by the source cell. The techniques discussed may be applied in some related situations where handovers for multiple group members are initiated at the same time, or nearly the same time, while the group leader is still served by the source cell. FIG. 6A, FIG. 6B and FIG. 6C are directed to examples where a handover of the group leader is performed before a handover of a group member is initiated.

FIG. 6A is a block diagram of an example of the communication system 100 where the group leader (first UE device) performs a handover to the target base station before managing a handover of the second UE device to the target base station. The example begins similarly to the example discussion above where all of the group members including the group leader are served by the source cell and are engaged in group communication. The first UE device sends first data to group members using an initial cast type. Therefore, the first data is transmitted in a first transmission 118 to the second UE device and in a second transmission 120 to the third UE device 112 using the initial cast type. Where the initial cast type is groupcast, the first transmission 118 and the second transmission 120 are the same transmission.

FIG. 6B is a block diagram of the handover management example where the group leader (first UE device) 108 has completed a handover to the target base station 104. The first UE device 108 selects an initial target cell cast type for the group after completing the handover. The first UE device determines whether the target cell supports the initial cast type and what resources are available for sidelink communication. Where the target cell can support the initial cast type, the initial cast type is selected as the initial target cell cast type. Where the target base station cannot support the initial cast type, the first UE device establishes new group communication which may include a different cast type form the initial cast type used in the source cell. For the example, the first UE device 108 continues to use the initial cast type for the all members of the group after the handover of the first UE device 108 to the target base station 104. Second data is sent to the second UE device 110 over a third transmission 602 using the initial target cell cast type and over a fourth transmission 604 to the third UE device 110 using the initial target cell cast type. Where the initial target cell cast type is groupcast, the third transmission 602 and the fourth transmission 604 are the same transmission.

FIG. 6C is a block diagram of the communication system 100 for the example where a handover has been initialized for the second UE device 110 to the target base station 104 when the target base station 104 is the serving base station of the first UE device 108. In accordance with known techniques, a handover is initialized when the second UE device 110 travels into the target base station service area 116. The first UE device 108 detects the handover initialization. For the example, the first UE device detects the handover initialization based on one or more messages sent from the second UE device. Such a technique is particularly useful where the initial cast type is groupcast. Unlike unicast connections, groupcast connections do not support PC5-RRC. As a result, control signaling directly over PC5 must be handled in the V2X application layer (but still over the PC5 link). Messages from the group member UE devices may be in response to requests from the first UE device (group leader) or may be initiated by the individual UE devices. Where the messages are initiated by the group member UE devices, a message may be triggered by a change in communication by the particular UE device. For example, a message can be sent by a UE device when a handoff is initiated and/or when a handoff is completed. Information regarding the target cell may be included in the message in some situations. Where the group leader initiates the transmission of the message with a request, the group leader may request cell ID information from the second UE device in some examples.

In other situations, the first UE device 108 detects the handover initialization by detecting changes in the transmission communication resources used by the second UE device 110 including transmissions of SL HARQ feedback. When the second UE device 110 enters the handover region 118 and a handover to the target base station 104 is initiated, the second UE device 110 determines whether exceptional resources are available. The second UE device 110 determines that it has entered the handover region based on the triggering of a measurement report. If exceptional resources are available, the second UE device 110 uses the exceptional resources for sidelink transmission to the first UE device 108. For the example, the first UE device 108 monitors all sidelink resources including exceptional resources and can detect when the second UE device 110 is using resources not originally assigned by the source base station 102. Where first UE device 108 is within a vehicle, as in most situations, power consumption for monitoring the resources is not generally a concern. In some situations where there is no upcoming sidelink transmission from the second UE device to the first UE device, the second UE device 110 sends an indicator to allow the first UE device 108 to detect the change in communication resources and detect the initiation of the handover.

In response to detecting that a handover of the second UE device 110 has been initiated, the first UE device 108 selects the cast type for transmission of sidelink transmissions to the second UE device 110 during the handover. The first UE device 108 determines whether a change in cast type during the handover is beneficial for communication with the second UE device 110. Any combination of factors can be evaluated to determine whether a change in cast type is appropriate. In one example where the current cast type is groupcast, the first UE device 108 may evaluate whether unicast is preferred based on the availability of exceptional resources. Therefore, if the first UE device 108 determines the second UE device 110 is using exceptional resources, the first UE device 108 may select unicast as the handover cast type. Although the use of exceptional resources may require the use of contention-based resources, the unicast connection may nonetheless be more reliable. In an example where the current cast type is unicast, the first UE device 108 may determine that groupcast is the appropriate handover cast type based on whether HARQ feedback resources are available. In some situations, HARQ feedback resources are not available as part of the exceptional resources and HARQ feedback is required to support a unicast connection, whereas HARQ feedback is optionally configured with groupcast. Therefore, the first UE device 108 may determine that the change from unicast to groupcast is needed in order to maintain HARQ feedback capability. For the example, the first UE device 108 is notified through SIB whether HARQ feedback resources are available in the handover region 118.

In some situations, the first UE device 108 may select the handover cast type based on the available resources for UE to UE (sidelink) communication in the target cell. Typically, it is unknown to a UE whether the V2X layer a V2X session can be supported from the AS layer perspective. For the example, however, the first UE device 108 obtains information regarding the configurable SLRB for a cast type (e.g., unicast or groupcast) from the target base station 104. In some situations, a default SLRB configuration may be provided by the target base station at least before an updated SLRB configuration can be provided to the first UE device 108. In some other situations, the first UE device 108 provides the target base station 104 with the number of group members and their UE IDs before obtaining the information. Based on the feedback from the target base station 104, the first UE device 108 may select a handover cast type for the second UE device 110. After selecting the handover cast type, the first UE device 108 indicates the mode of communication for a V2X message to the AS layer and transmits third data in a fifth transmission 606 using the handover cast type to the second UE device 110. The third data is also transmitted to the third UE device 112 in a sixth transmission 608 using the initial target cell cast type. In some scenarios, therefore, the first UE device transmits the same data to group members using different cast types during a handover.

Figure 6D:
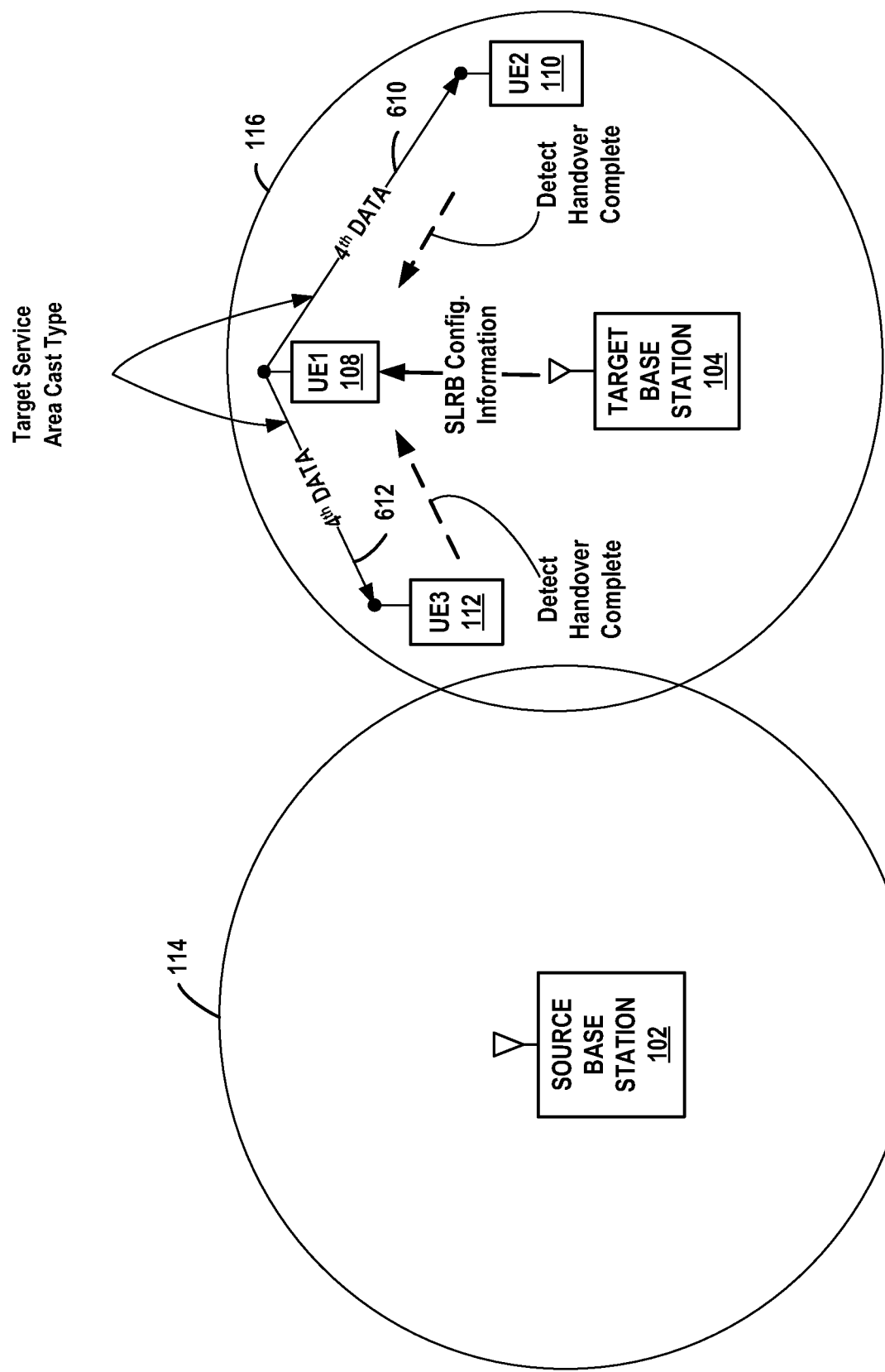
FIG. 6D is a block diagram of the communication system for the example where the handover for each UE device of the group has been completed.

FIG. 6D is a block diagram of the communication system 100 for the example where the handover for each UE device of the group 106 has been completed. The first UE device 108 determines that each UE device 110, 112 of the group 106 has completed a handover to the target base station. The determination may be based on messages from the group member UE devices or based on detection of the transmission resources being used by the UE devices. As discussed above, messages from the group member UE devices may be in response to requests from the first UE device (group leader) or may be initiated by the individual UE devices. Where the messages are initiated by the group member UE devices, a message may be triggered by a change in communication by the particular UE device. For example, a message can be sent by a UE device when the handoff is completed. Information regarding the target cell may be included in the message in some situations. Where the group leader initiates the transmission of the message with a request, the group leader may request cell ID information from the second UE device in some examples. In other situations, the first UE device 108 detects the handover initialization by detecting changes in the transmission communication resources used by the second UE device including transmissions of SL HARQ feedback.

In response to detecting that each UE device 108, 110 has completed the handover to the target base station 104, the first UE device 108 selects the cast type for transmission of sidelink transmissions within the target base station service area 116. In the interests of clarity, the target base station and the target service area are referred to as such even though the target base station becomes a new serving base station for all of the UE devices after handovers are completed. For the example discussed herein, the first UE device 108 uses the SLRB configuration information from the target base station 104 to select the target service area cast type. The first UE device 108 first provides the number of group member UE devices and the UE identifiers (IDs) of the group members to the target base station. The target base station 104 provides, via the Access Stratum (AS) layer, the first UE device 108 with the SLRB configuration information for groupcast or unicast.

After selecting a target service area cast type for sidelink transmission in the target base station service area 116, the first UE device 108 transmits fourth data to the second UE device 110 and to the third UE device 112. Where the target service area cast type is unicast, the fourth data is transmitted in separate transmissions 610, 612 to the UE devices 110, 112. Where the target service area cast type is groupcast, the fourth data is transmitted in a single transmission that is received by both UE devices 110, 112. Accordingly, the transmissions 610, 612 for groupcast are the same transmission.

Figure 7:
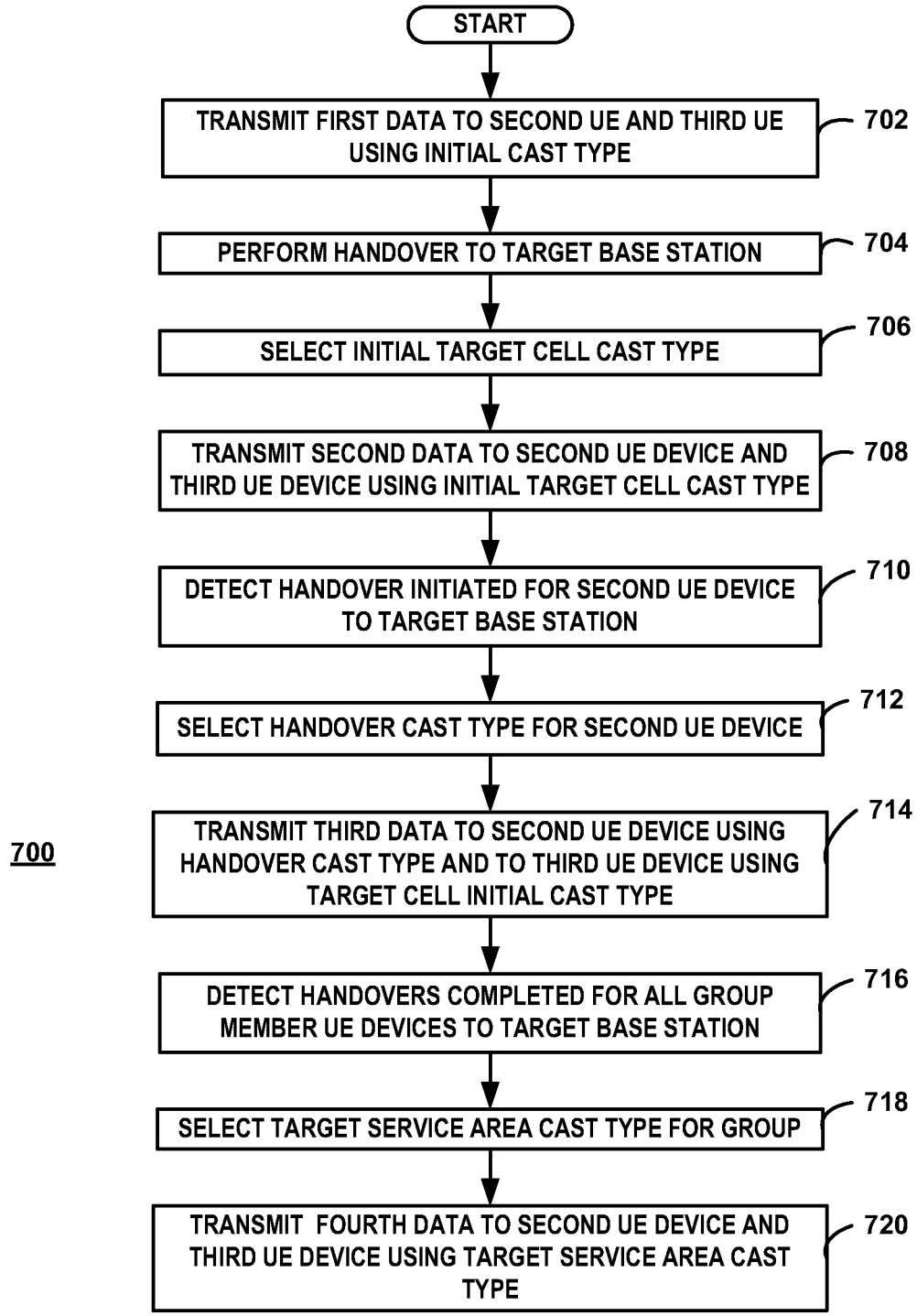
FIG. 7 is a flow chart of an example of a method of managing cast types for a group during a handover.

FIG. 7 is a flow chart of an example of a method 700 of managing cast types for a group 106 during a handover. For the example, the method is performed by a UE device operating in a NR V2X or LTE C-V2X system such as the system 100 described above. Accordingly, the method may be performed by the first UE device 108. For the example of FIG. 7, the second UE device 110 initiates a handover to the target base station 104 while the first UE device 108 is still served by the source base station 102.

At step 702, first data is transmitted to the second UE device 110 and a third UE device 112 using an initial cast type. For the example, the first data is sent to the second UE device 110 and the third UE device 112 using either groupcast or unicast. Other cast types may be used in some circumstances.

At step 704, a handover to the target base station is performed. In accordance with known techniques, the first UE device 108 performs measurement reports and communicates with the target base station 104 to transition to being served by the target base station 104.

At step 706, an initial target cell cast type is selected for group communication. Based on the available transmission sidelink resources in the target cell and the cast types that are supported, the first UE device 108 selects the initial target cell cast type. Where the resources are available the initial cast type used in the source cell is selected as the initial target cell cast type.

At step 708, second data is transmitted to the group member UE devices using the initial target cell cast type. The second data is transmitted to the second UE device 110 and the third UE device using the initial target cell cast type.

At step 710, the first UE device (group leader) 108 detects that a handover has been initiated for the second UE device 110 from the source base station 102 to the target base station 104. The first UE device 108 may detect the handover has been initiated based on information sent in a message by the second UE device 110 or may detect the handover has been initiated by the change in transmission resources used by the second UE device 110 to send a sidelink transmission to the first UE device 108. For example, the first UE device 108 may detect that exceptional resources were used by the second UE device 110 indicating that the second UE device is in the handover region 118.

At step 712, the first UE device 108 selects a handover cast type from a set of cast types for the second UE device. The selection is typically based on consideration of factors related to reliability of the sidelink and efficiency. In some circumstances, the first UE device 108 may select the initial cast type as the handover cast type. In another situation, the initial cast type may be groupcast and the first UE device 108 selects unicast. In yet in another situation, the initial cast type may be unicast and the first UE device 108 selects group cast.

At step 714, the first UE device 108 transmits third data to the second UE device 110 using the selected handover cast type and transmits the third data to the third UE device 112 using the initial target cell cast type.

At step 716, the first UE device 108 detects that all group members have performed handovers to the target base station. In some situations, the group members send messages to the group leader notifying the group leader of the new serving cell.

At step 718, the target service area cast type is selected for the group. In response to detecting that each UE device 108, 110 has completed the handover to the target base station 104, the first UE device 108 selects the cast type for transmission of sidelink transmissions within the target base station service area 116. The first UE device 108 uses the SLRB configuration information from the target base station 104 to select the target service area cast type. The first UE device 108 first provides the number of group member UE devices and the UE identifiers (IDs) of the group members to the target base station. The target base station 104 provides, via the Access Stratum (AS) layer, the first UE device 108 with the SLRB configuration information for groupcast or unicast.

At step 720, fourth data is transmitted to the group using the target service area cast type. The first UE device 108 transmits the fourth data to the second UE device over a fifth transmission and to the third UE device 112 over a sixth transmission. Where the target service area cast type is group cast, the fifth transmission and the sixth transmission are the same transmission.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
    transmitting, first data in a first transmission using an initial cast type of a set of cast types comprising groupcast and unicast, from a first user equipment (UE) device to a second UE device of a group and to a third UE device of the group, the first UE device, the second UE device and the third UE device being served by a source base station;
    in response to the first UE device determining that the second UE device has initiated a handover to a target base station:
        selecting, by the first UE device, a handover cast type from the set of cast types;
        transmitting, second data in a second transmission using the handover cast type, from the first UE device to the second UE device; and
        transmitting, the second data in a third transmission using the initial cast type, from the first UE device to the third UE device; and
    in response to determining all UE devices of the group have completed handovers to the target base station, transmitting third data in a fourth transmission using one of the initial cast type and the handover cast type, from the first UE device to the second UE device and the third UE device.

2. The method of claim 1, wherein the handover cast type is different from the initial cast type.

3. The method of claim 1, wherein the handover cast type is the initial cast type.

4. The method of claim 1, further comprising:
    determining available side link radio bearer (SLRB) configurations in a target cell of the target base station; and
    based at least on the available SLRB configurations, selecting a target base station region cast type from the set of cast types, the target base station region cast type used for the fourth transmission.

5. The method of claim 1, further comprising:
receiving a handover initiation message from the second UE device; and
determining that the second UE device has initiated the handover to the target base station based on the handover initiation message.

6. The method of claim 1, further comprising:
detecting a change in transmission communication resources used by the second UE device;
determining that the second UE device has initiated the handover to the target base station based on the detection of the change in transmission communication resources.

7. The method of claim 6, wherein detecting the change in transmission communication resources comprises receiving sidelink hybrid automatic repeat request (SL HARQ) transmissions.

8. The method of claim 1, wherein the initial cast type is groupcast, the handover cast type is unicast, and the target base station region cast type is unicast.

9. The method of claim 1, wherein the initial cast type is groupcast, the handover cast type is unicast, and the target base station region cast type is groupcast.

10. A first user equipment (UE) device comprising:
a transmitter configured to transmit, first data in a first transmission using an initial cast type of a set of cast types comprising groupcast and unicast, from the first user equipment (UE) device to a second UE device of a group and to a third UE device of the group, the first UE device, the second UE device and the third UE device being served by a source base station;
a receiver configured to receive signals from the second UE device; and
a controller configured to detect a change in transmission communication resources used by the second UE device based on the received signals and to determine that the second UE device has initiated a handover to a target base station based on the detection of the change in transmission communication resources;
the controller, in response to determining that the second UE device has initiated the handover to the target base station, configured to:
determine available communication resources for UE to UE communication in a handover region between cells of the source base station and the target base station; and
based on the available communication resources in the handover region, select a handover cast type from the set of cast types;
the transmitter configured to:
transmit, second data in a second transmission using the handover cast type, from the first UE device to the second UE device; and
transmit, the second data in a third transmission using the initial cast type, from the first UE device to the third UE device.

11. The first UE device of claim 10, wherein the handover cast type is different from the initial cast type.

12. The first UE device of claim 10, wherein the handover cast type is the initial cast type.

13. The first UE device of claim 10, wherein:
the controller is further configured to determine that all UE devices of the group have completed handovers to the target base station; and
the transmitter is further configured to, after all members of the group have completed handovers to the target base station, transmit third data to the second UE device and the third UE device in a fourth transmission using one of the initial cast type and the handover cast type.

14. The first UE device of claim 13, wherein the controller is further configured to:
determine available sidelink radio bearer (SLRB) configurations in a target cell of the target base station; and
based on the available SLRB configurations, select a target base station region cast type from the set of cast types, the target base station region cast type used for the fourth transmission.

15. The first UE device of claim 10, wherein the controller is configured to detect the change in transmission communication resources based on receiving sidelink hybrid automatic repeat request (SL HARQ) transmissions.

16. The first UE device of claim 10, wherein the initial cast type is groupcast, the handover cast type is unicast, and the target base station region cast type is unicast.

\* \* \* \* \*